(12) United States Patent
Kim et al.

(10) Patent No.: US 9,954,606 B2
(45) Date of Patent: Apr. 24, 2018

(54) STRUCTURE OF FULL DUPLEX RADIO REGION APPLIED IN RADIO ACCESS SYSTEM SUPPORTING FULL DUPLEX RADIO SCHEME, AND METHOD AND APPARATUS FOR ALLOCATING SAME

(71) Applicant: LG ELECTRONICS INC., Seoul (KR)

(72) Inventors: Jinmin Kim, Seoul (KR); Kitae Kim, Seoul (KR); Jaehoon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 126 days.

(21) Appl. No.: 14/890,555

(22) PCT Filed: May 22, 2014

(86) PCT No.: PCT/KR2014/004568
§ 371 (c)(1),
(2) Date: Nov. 11, 2015

(87) PCT Pub. No.: WO2014/189301
PCT Pub. Date: Nov. 27, 2014

(65) Prior Publication Data
US 2016/0087715 A1 Mar. 24, 2016

Related U.S. Application Data

(60) Provisional application No. 61/826,452, filed on May 22, 2013.

(51) Int. Cl.
*H04B 7/26* (2006.01)
*H04L 5/14* (2006.01)
(Continued)

(52) U.S. Cl.
CPC ......... *H04B 7/2615* (2013.01); *H04L 5/0091* (2013.01); *H04L 5/14* (2013.01); *H04W 72/042* (2013.01); *H04W 72/048* (2013.01)

(58) Field of Classification Search
CPC ..... H04L 5/14; H04L 27/2601; H04L 5/0007; H04L 27/2647; H04L 5/023
See application file for complete search history.

(56) References Cited

U.S. PATENT DOCUMENTS

2009/0268645 A1   10/2009   Chindapol et al.
2010/0034123 A1    2/2010   Razdan et al.
(Continued)

FOREIGN PATENT DOCUMENTS

CN        1537366       10/2004
CN      101123608        2/2008
(Continued)

OTHER PUBLICATIONS

European Patent Office Application Serial No. 14801375.8, Search Report dated Dec. 9, 2016, 8 pages.
(Continued)

*Primary Examiner* — Jung Park
(74) *Attorney, Agent, or Firm* — Lee Hong Degerman Kang & Waimey

(57) ABSTRACT

The present invention relates to a structure of a full duplex radio (FDR) region in an FDR system. Further, the present invention provides a method and apparatuses for transmitting allocation information on a configured FDR region. In an embodiment of the present invention, a method of allocating an FDR region by a base station in a radio access system supporting an FDR scheme comprises the steps of: transmitting a control signal including FDR region allocation information to a terminal and performing FDR-based communication with the terminal through an FDR region
(Continued)

indicated by the FDR region allocation information. At this time, the FDR region allocation information may contain one or more of first number information indicating a number of subcarriers included in the FDR region, position information indicating an allocation position of the FDR region, and second number information indicating a number of subcarriers included in a guard region used for reducing interference.

15 Claims, 15 Drawing Sheets

(51) Int. Cl.
*H04W 72/04* (2009.01)
*H04L 5/00* (2006.01)

(56) References Cited

U.S. PATENT DOCUMENTS

| | | | |
|---|---|---|---|
| 2012/0201153 A1 | 8/2012 | Bharadia et al. | |
| 2012/0207038 A1* | 8/2012 | Choi | H04W 16/14 370/252 |
| 2013/0021954 A1 | 1/2013 | Montojo et al. | |
| 2014/0031031 A1* | 1/2014 | Gauvreau | H04L 5/0053 455/426.1 |
| 2014/0086112 A1* | 3/2014 | Stern-Berkowitz | H04W 72/1289 370/280 |
| 2014/0307763 A1* | 10/2014 | Eriksson | H04B 3/46 375/222 |

FOREIGN PATENT DOCUMENTS

| | | |
|---|---|---|
| JP | 2007-143138 | 6/2007 |
| JP | 2009-538063 | 10/2009 |

OTHER PUBLICATIONS

Mitsubishi Electric, "UE-specific idle period for half-duplex FDD", R1-072065, 3GPP TSG RAN WG1 Meeting #49, May 2007, 7 pages.
Li et al., "System Scenarios and Technical Requirements for Full-Duplex Concept," DUPLO, XP055158748, Apr. 2013, 58 pages.
PCT International Application No. PCT/KR2014/004568, Written Opinion of the International Searching Authority dated Aug. 14, 2014, 22 pages.

* cited by examiner

FIG. 4
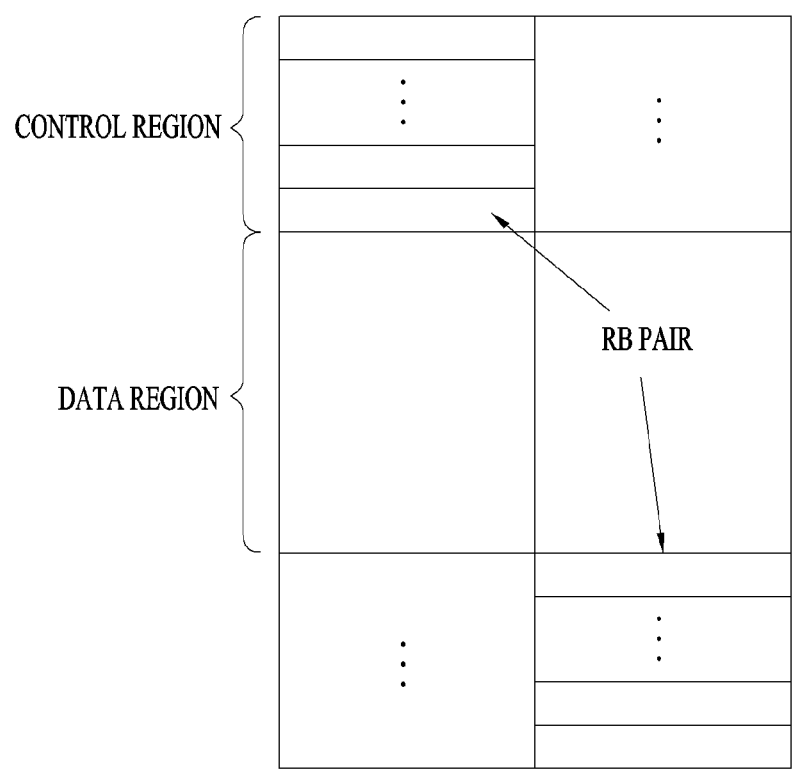
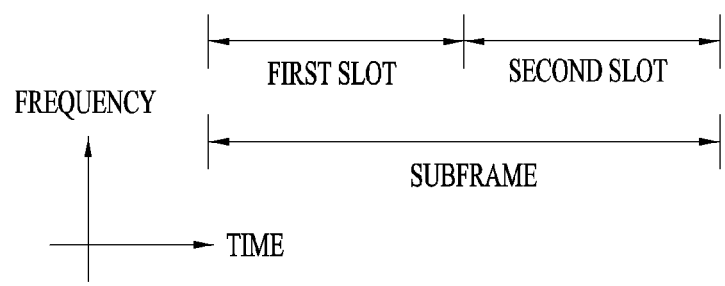

Before ADC

After ADC

Digital interference
cancellation and scaling

STRUCTURE OF FULL DUPLEX RADIO REGION APPLIED IN RADIO ACCESS SYSTEM SUPPORTING FULL DUPLEX RADIO SCHEME, AND METHOD AND APPARATUS FOR ALLOCATING SAME

CROSS-REFERENCE TO RELATED APPLICATIONS

This application is the National Stage filing under 35 U.S.C. 371 of International Application No. PCT/KR2014/004568, filed on May 22, 2014, which claims the benefit of U.S. Provisional Application No. 61/826,452, filed on May 22, 2013, the contents of which are all hereby incorporated by reference herein in their entirety.

TECHNICAL FIELD

The present invention relates to the structure of a Full Duplex Radio (FDR) zone in an FDR system which is one of wireless access systems and to a method and apparatus for transmitting allocation information about a configured FDR zone.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

That is, in legacy wireless access systems, a Base Station (BS) or a UE performs communication using a Half Duplex Radio (HDR) scheme of a Frequency Division Duplex (FDD) scheme for transmitting signals on a wireless resource divided based on frequency or a Time Division Duplex (TDD) scheme for transmitting signals on a wireless resource divided based on time.

However, in the HDR communication scheme, the UE and/or the BS are incapable of simultaneously performing reception and transmission in the same frequency/time resource. Therefore, introduction of an FDR communication scheme has been proposed to efficiently use resources. The FDR communication scheme refers to a scheme in which the BS and/or the UE simultaneously transmit and receive different signals in the same frequency/time resource zone.

Notably, since the BS and/or the UE simultaneously perform data transmission and reception through the same resource zone in a communication environment of the FDR scheme, self-interference in which a signal transmitted by the BS or the UE is received through a reception antenna of the BS or the UE occurs. In addition, mutual interference may occur when both an FDR zone and an HDR zone are configured together. Accordingly, in a communication environment supporting the FDR scheme, a new method for configuring the FDR zone is needed.

DISCLOSURE

Technical Problem

An object of the present invention is to provide a method for performing efficient communication.

Another object of the present invention is to provide a method for configuring an FDR zone to increase data throughput in an FDR system.

Another object of the present invention is to provide a method for allocating an FDR zone in an FDR system.

Another object of the present invention is to provide an apparatus for supporting the above methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention relates to a structure of an FDR zone in an FDR system and provides methods and apparatuses for transmitting allocation information about the FDR zone.

In an aspect of the present invention, provided herein is a method for allocating a Full Duplex Radio (FDR) zone by a Base Station (BS) in a wireless access system supporting an FDR scheme. The method may include transmitting a control signal including FDR zone allocation information to a User Equipment (UE) and performing FDR based communication with the UE through an FDR zone indicated by the FDR zone allocation information. The FDR zone allocation information may include one or more of first number information indicating the number of subcarriers constituting the FDR zone, location information indicating an allocation location of the FDR zone, and second number information indicating the number of subcarriers constituting a guard zone used to reduce interference.

In another aspect of the present invention, provided herein is a method for receiving Full Duplex Radio (FDR) zone allocation information in a wireless access system supporting an FDR scheme. The method may include receiving a control signal including the FDR zone allocation information from a Base Station (BS) and performing FDR based communication with the BS through an FDR zone indicated by the FDR zone allocation information. The FDR zone allocation information may include one or more of first number information indicating the number of subcarriers constituting the FDR zone, location information indicating an allocation location of the FDR zone, and second number information indicating the number of subcarriers constituting a guard zone used to reduce interference.

In another aspect of the present invention, provided herein is a User Equipment (UE) for receiving Full Duplex Radio (FDR) zone allocation information in a wireless access system supporting an FDR scheme. The UE may include a receiver, a transmitter, and a processor configured to support an FDR scheme in association with the receiver and the transmitter.

The processor may be configured to receive a control signal including the FDR zone allocation information from a Base Station (BS) by controlling the receiver and perform FDR based communication with the BS through an FDR zone indicated by the FDR zone allocation information by controlling the transmitter and the receiver, wherein the FDR zone allocation information may include one or more of first number information indicating the number of subcarriers constituting the FDR zone, location information indicating an allocation location of the FDR zone, and second number information indicating the number of subcarriers constituting a guard zone used to reduce interference.

In the aspects of the present invention, the control signal may be a Physical Downlink Control Channel (PDCCH) signal transmitted through a control channel region or an Enhanced-Physical Downlink Control Channel (E-PDCCH) transmitted through a data channel region.

If the FDR zone allocation information is semi-statically configured during a predetermined number of Transmission Time Intervals (TTIs), the FDR zone allocation information may be transmitted through a higher-layer signal.

If the FDR zone allocation information is transmitted through UE-specific signaling, the FDR zone allocation information may be differently defined according to each UE managed by a Base Station (BS).

If the FDR zone allocation information is transmitted through cell-specific signaling, the FDR zone allocation information may be defined according to each cell.

The afore-described aspects of the present invention are merely a part of preferred embodiments of the present invention. Those skilled in the art will derive and understand various embodiments reflecting the technical features of the present invention from the following detailed description of the present invention.

Advantageous Effects

According to the embodiments of the present invention, the following effects can be achieved.

First, efficient communication can be performed in a wireless access system supporting FDR.

Second, data throughput can increase in an FDR system by configuring an FDR zone.

Third, the FDR zone can be allocated using methods disclosed in the present invention with respect to the configured FDR zone.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings:

FIG. 4 illustrates a structure of an UpLink (UL) subframe, which may be used in embodiments of the present invention;

BEST MODE

Figure 1:
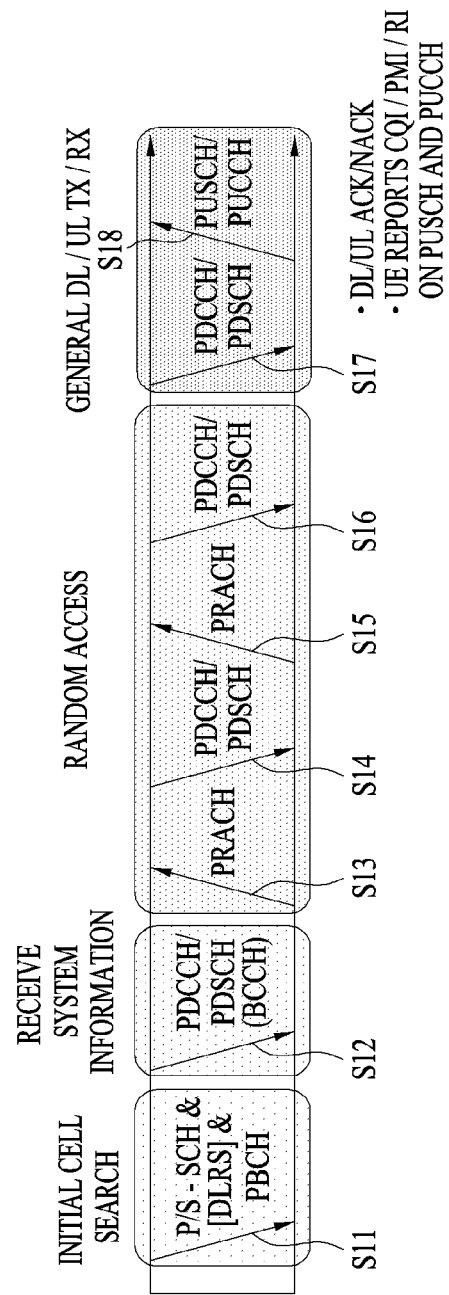
FIG. 1 illustrates physical channels and a general signal transmission method using the physical channels, which may be used in embodiments of the present invention.

The present invention described below defines the structure of a Full Duplex Radio (FDR) zone in an FDR system which is one of wireless access systems. The present invention provides methods and apparatuses for transmitting allocation information about a configured FDR zone.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the embodiments of the present invention, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present invention, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DL.

The embodiments of the present invention may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present invention may be supported by the standard specifications, 3GPP TS 36.211, 3GPP TS 36.212, 3GPP TS 36.213, and 3GPP TS 36.321. That is, the steps or parts, which are not described to clearly reveal the technical idea of the present invention, in the embodiments of the present invention may be explained by the above standard specifications. All terms used in the embodiments of the present invention may be explained by the standard specifications.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific terms in order to provide a thorough understanding of the present invention. However, it will be apparent to those skilled in the art that the specific terms may be replaced with other terms without departing the technical spirit and scope of the present invention.

For example, the term used in embodiments of the present invention, 'synchronization signal' is interchangeable with a synchronization sequence, a training symbol or a synchronization preamble in the same meaning.

The embodiments of the present invention can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present invention are described in the context of a 3GPP LTE/LTE-A system in order to clarify the technical features of the present invention, the present invention is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present invention.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
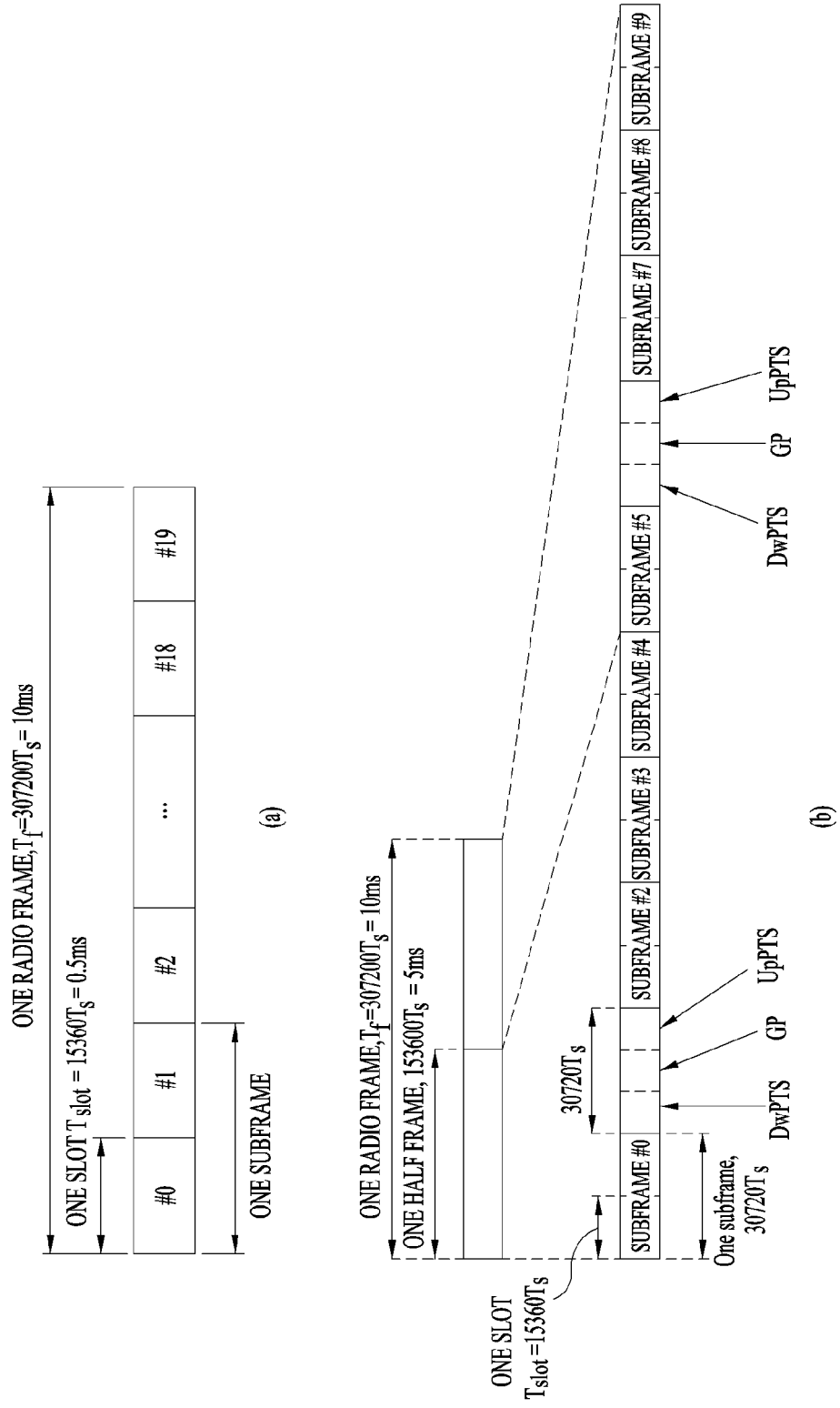
FIG. 2 illustrates radio frame structures used in embodiments of the present invention.

FIG. 2 illustrates exemplary radio frame structures used in embodiments of the present invention.

FIG. 2(a) illustrates frame structure type 1. Frame structure type 1 is applicable to both a full Frequency Division Duplex (FDD) system and a half FDD system.

One radio frame is 10 ms ($T_f$=307200·$T_s$) long, including equal-sized 20 slots indexed from 0 to 19. Each slot is 0.5 ms ($T_{slot}$=15360·$T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). Ts is a sampling time given as $T_s$=1/(15 kHz×2048)=3.2552×10$^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f$=307200·$T_s$) long, including two half-frames each having a length of 5 ms (=153600·$T_s$) long. Each half-frame includes five subframes each being 1 ms (=30720·$T_s$) long. An $i^{th}$ subframe includes $2i^{th}$ and $(2i+1)^{th}$ slots each having a length of 0.5 ms ($T_{slot}$=15360·$T_s$). $T_s$ is a sampling time given as $T_s$=1/(15 kHz×2048)=3.2552×10$^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

Figure 3:
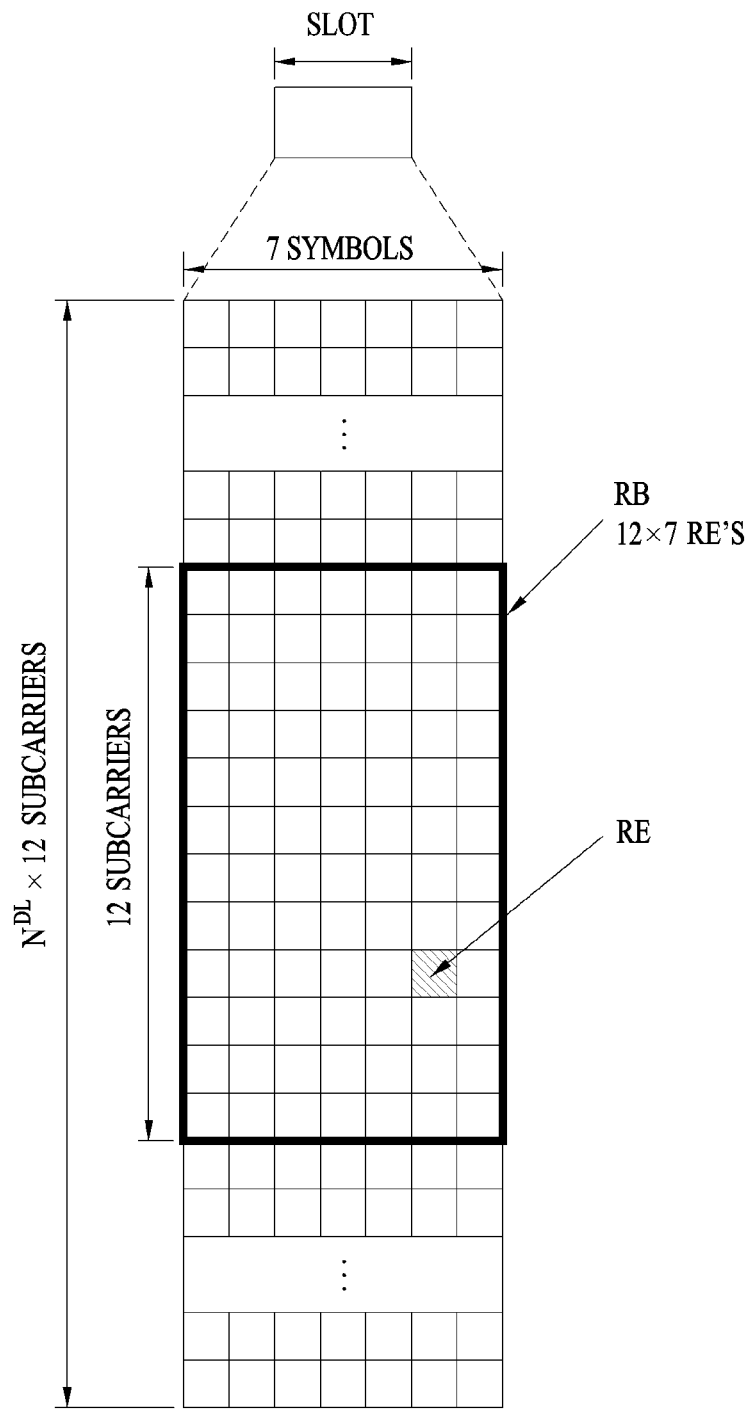
FIG. 3 illustrates a structure of a DownLink (DL) resource grid for the duration of one DL slot, which may be used in embodiments of the present invention.

FIG. 3 illustrates an exemplary structure of a DL resource grid for the duration of one DL slot, which may be used in embodiments of the present invention.

Referring to FIG. 3, a DL slot includes a plurality of OFDM symbols in the time domain. One DL slot includes 7 OFDM symbols in the time domain and an RB includes 12 subcarriers in the frequency domain, to which the present invention is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

FIG. 4 illustrates a structure of a UL subframe which may be used in embodiments of the present invention.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
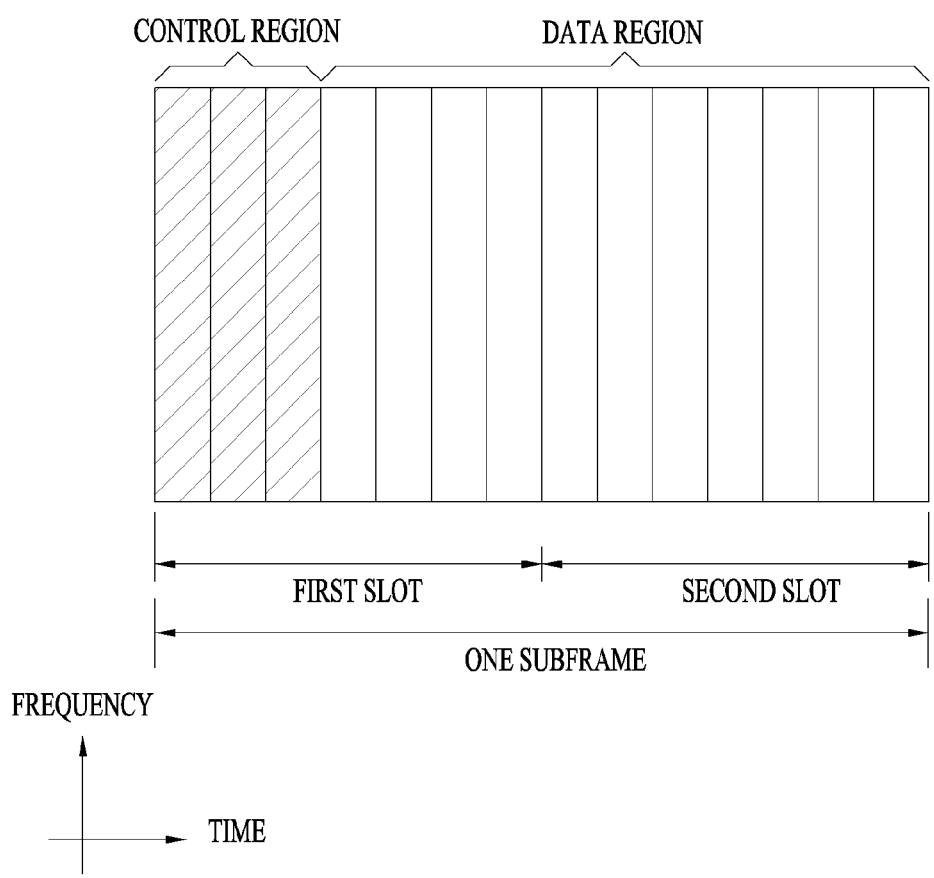
FIG. 5 illustrates a structure of a DL subframe, which may be used in embodiments of the present invention.

FIG. 5 illustrates a structure of a DL subframe that may be used in embodiments of the present invention.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

2. Carrier Aggregation (CA) Environment

2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present invention, multi-carrier means CA (or carrier combining) Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation.

The term CA is interchangeable with carrier combining, bandwidth aggregation, spectrum aggregation, etc. The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present invention may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present invention.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set is preferably defined within the UE DL CC set. That is, the eNB transmits a PDCCH only in the PDCCH monitoring set to schedule a PDSCH or PUSCH for the UE.

Figure 6:
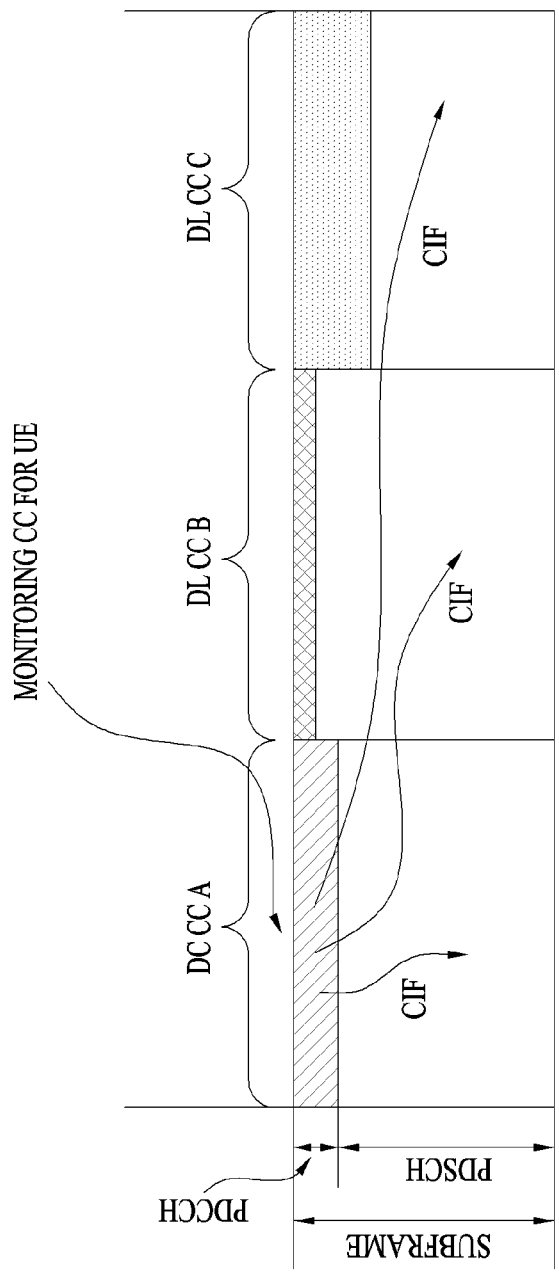
FIG. 6 illustrates a cross carrier-scheduled subframe structure in the LTE-A system, which is used in embodiments of the present invention.

FIG. 6 illustrates a cross carrier-scheduled subframe structure in the LTE-A system, which is used in embodiments of the present invention.

Referring to FIG. 6, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

3. FDR System

An FDR system is applicable to the above-described LTE/LTE-A system. That is, all of a frame structure, a control signal transmission and reception method, and support of a CA scheme, defined in the LTE/LTE-A system, may be applied to the FDR system. Hereinafter, an interference cancellation method specific to the FDR system will be described in more detail.

3.1 Interference Cancellation in FDR System

FDR refers to a system that simultaneously supports data transmission and reception using the same resource (i.e., the same time and the same frequency) in one UE. FDR may be a new type of wireless access system. However, in embodiments of the present invention, it is assumed that the FDR system operates based on the LTE/LTE-A system as described in FIGS. 1 to 6.

Figure 7:
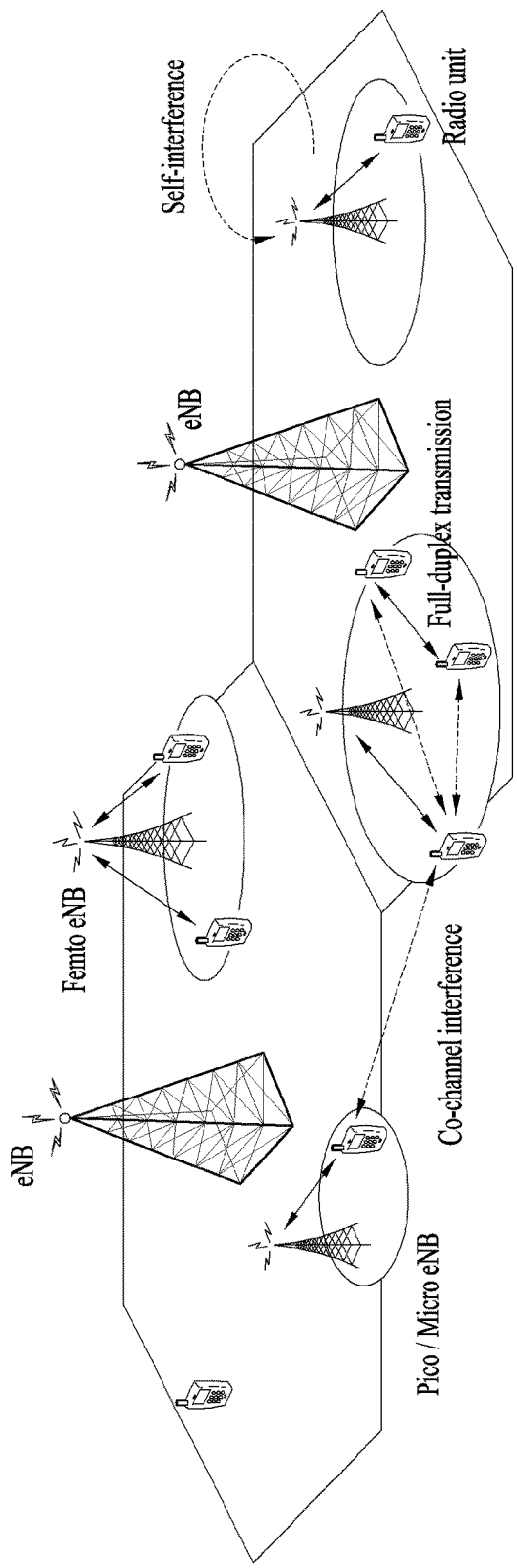
FIG. 7 is a diagram illustrating deployment of an exemplary wireless access system supporting FDR.

FIG. 7 is a diagram illustrating deployment of an exemplary wireless access system supporting FDR.

Referring to FIG. 7, a wireless access system supporting FDR includes a macro eNB managing a normal cell, a small eNB managing a small cell, and a UE (i.e., a wireless unit). The small eNB includes a micro eNB, a femto eNB, a pico eNB, and the like.

In a situation as illustrated in FIG. 7, there may be three types of interference described below.

(1) Intra-Device Interference (IDI)

IDI indicates that a signal transmitted from a transmission antenna of an eNB or a UE is received by a reception antenna, thereby acting as interference due to characteristics of FDR. A signal transmitted from a transmission antenna of a specific device has higher power than a received signal. That is, since a signal transmitted by a transmission antenna of a specific device is received by a reception antenna of the specific device almost without attenuation due to a short distance between the transmission antenna and the reception antenna, the signal transmitted from the transmission antenna of the specific device is received at much higher power than a desired signal that the specific device expects to receive from a peer device.

(2) UE-to-UE Inter-Link Interference

UE-to-UE inter-link interference indicates that a UL signal transmitted by a specific UE is received by another UE adjacent to the specific UE, thereby acting as interference.

(3) BS-to-BS Inter-Link Interference

BS-to-BS inter-link interference indicates that a signal transmitted between eNBs or between heterogeneous eNBs in a Heterogeneous Network (HetNet) situation is received by a reception antenna of another eNB, thereby acting as interference.

From among the above three types of interference, IDI (hereinafter, self-interference) is affected by interference generated only in FDR and should be solved first for FDR management.

Figure 8:
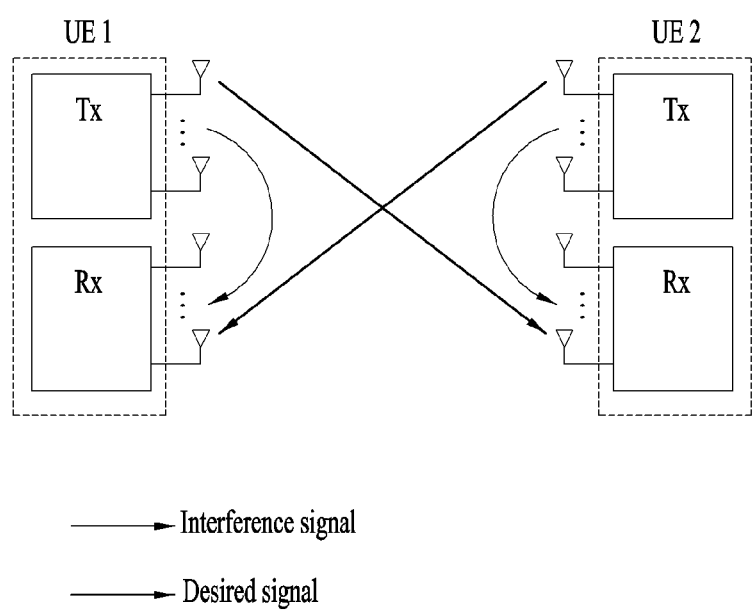
FIG. 8 is a diagram illustrating the concept of self-interference occurring in an FDR system.

FIG. 8 is a diagram illustrating the concept of self-interference occurring in an FDR system.

Although FIG. 8 shows data communication performed between UEs for convenience of description, the present invention is identically applicable to data communication performed between a UE and an eNB.

Referring to FIG. 8, in an FDR environment, a transmission signal transmitted by a transmission antenna of a first UE (i.e., UE1) to a second UE (i.e., UE2) is received by a reception antenna of the first UE, thereby acting as an interference signal. Such self-interference has unique characteristics as opposed to other interference.

First, the first UE may regard a signal causing interference as a perfectly known signal because a self-interference signal received through the reception antenna of the first UE is the transmission signal transmitted by the first UE.

Second, power of the interference signal is remarkably higher than power of a desired signal that the first UE desires to receive because a distance between the transmission antenna and the reception antenna of the first UE is much narrower than a distance between the first UE and the second UE. Due to these characteristics, a receiver is unable to perfectly cancel the interference signal even though a UE is fully aware of the interference signal.

A receiver of a UE may use an Analog-to-Digital Converter (ADC) to convert a received signal into a digital signal. Generally, the ADC measures power of the received signal to adjust a power level of the received signal, quantizes the received signal, and converts the received signal into a digital signal. However, since an interference signal is received by the receiver at a remarkably higher power relative to a desired signal, characteristics of a desired signal are all covered by a quantization level during quantization and thus the receiver may be unable to restore the received signal.

Figure 9:
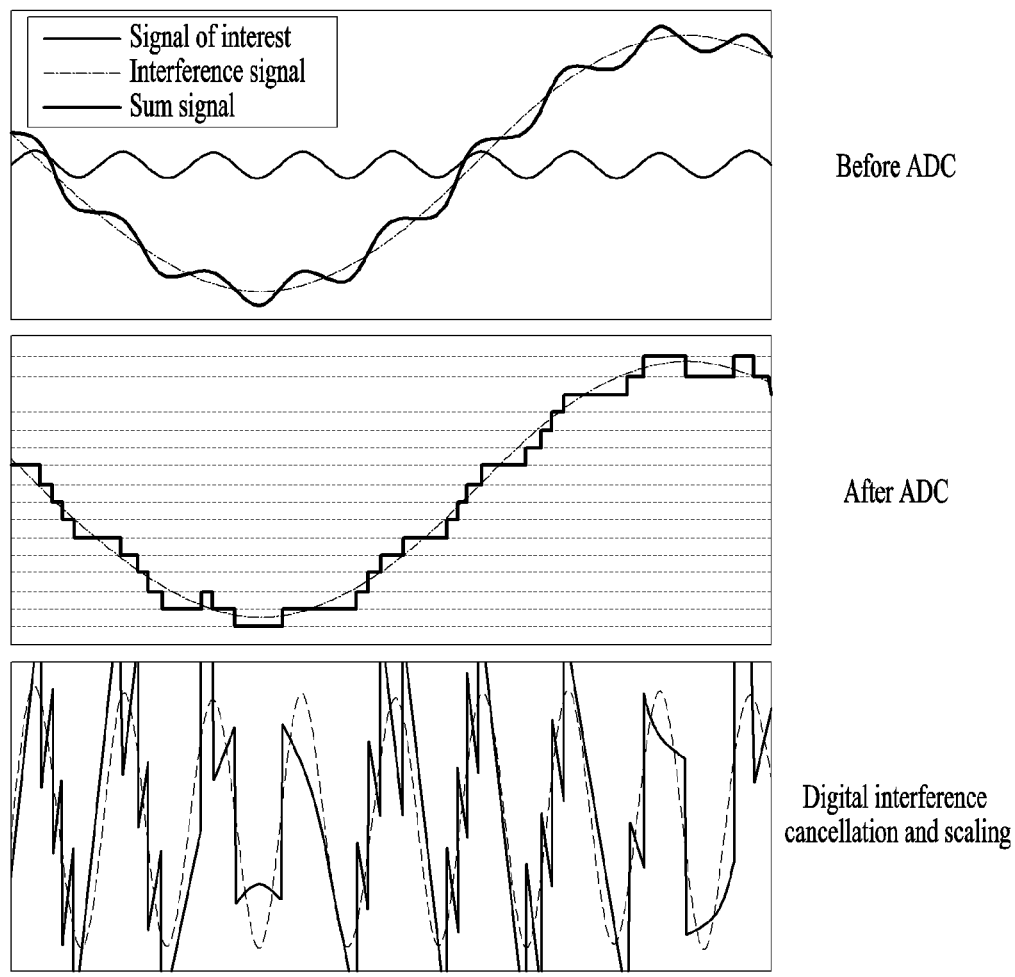
FIG. 9 is a diagram illustrating signal distortion caused by a quantization error when power of an interference signal is higher than power of a desired signal.
Figure 10:
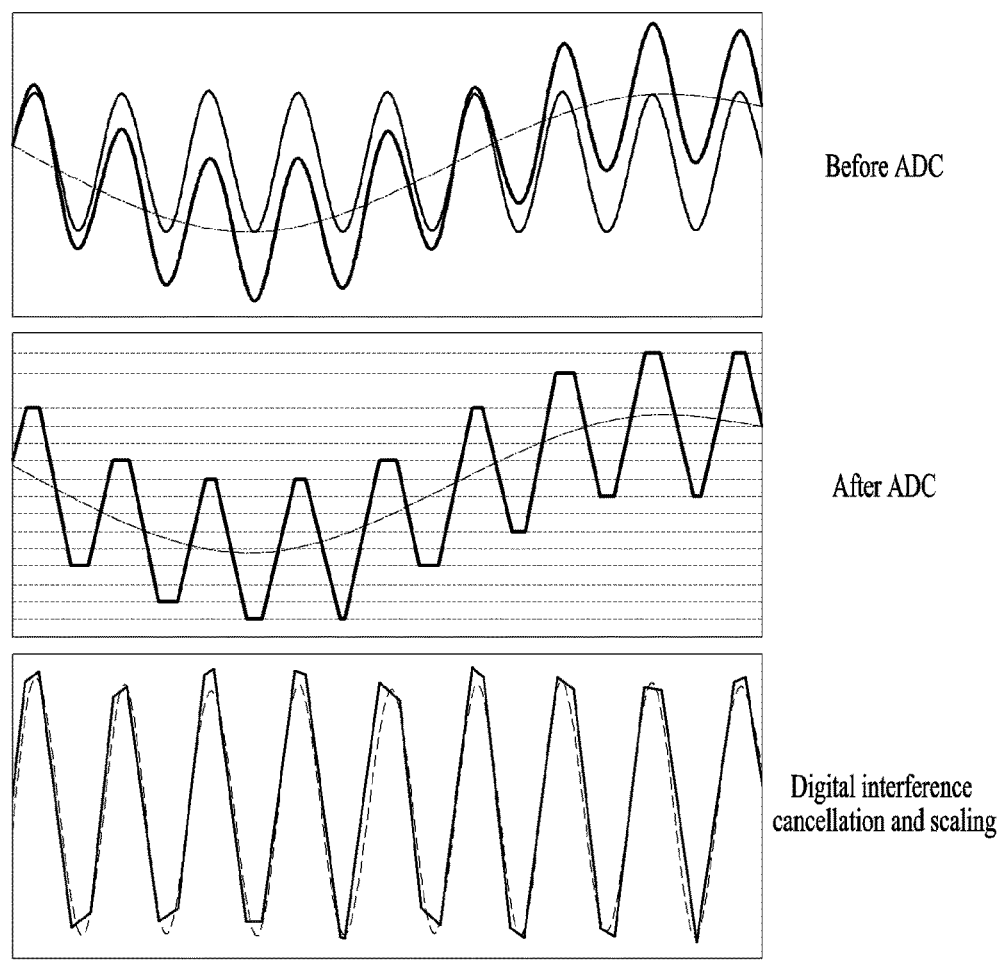
FIG. 10 is a diagram illustrating a signal restoration state when power of an interference signal is lower than power of a desired signal.

FIG. 9 is a diagram illustrating signal distortion caused by a quantization error when power of an interference signal is higher than power of a desired signal and FIG. 10 is a diagram illustrating a signal restoration state when power of an interference signal is lower than power of a desired signal.

As can be seen from FIG. 9, a desired signal is severely distorted even when an interference signal is eliminated in a situation in which the interference signal has remarkably higher power than the desired signal on the assumption that 4-bit quantization is performed. In contrast, FIG. 10 shows that a desired signal is restored after an interference signal is eliminated when the interference signal has lower power than the desired signal.

Figure 11:
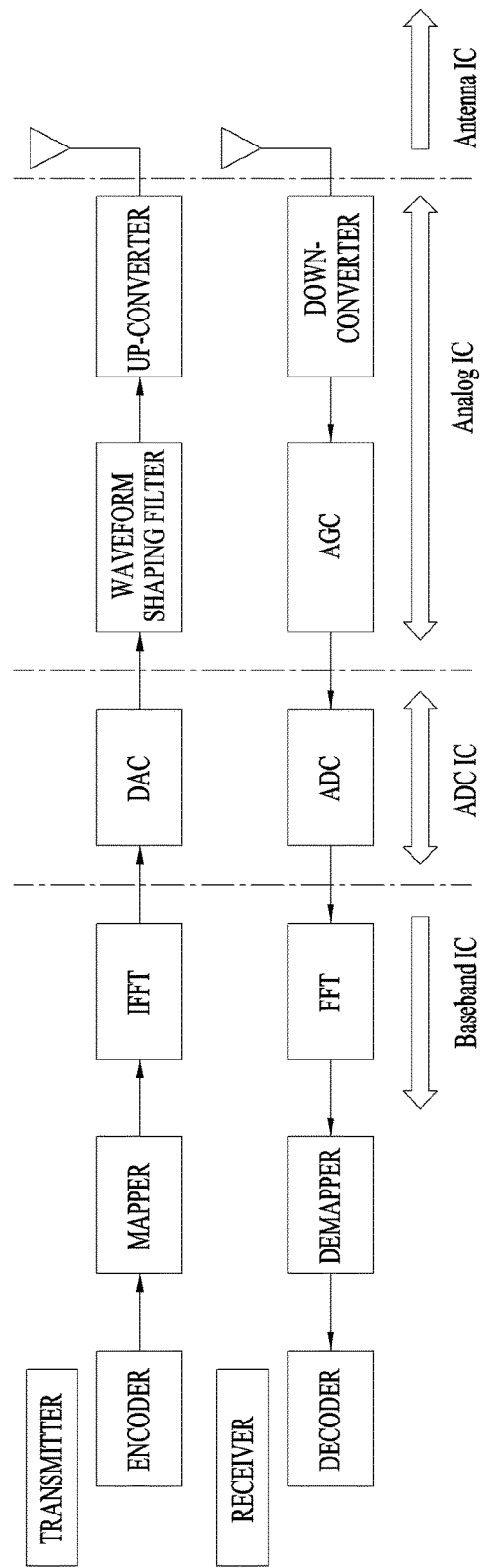
FIG. 11 is a block diagram of a transmitter and a receiver to which schemes for cancelling self-interference are applied.

FIG. 11 is a block diagram of a transmitter and a receiver to which schemes for cancelling self-interference are applied.

Referring to FIG. 11, the transmitter may include an encoder for encoding a data bit, a mapper for mapping the encoded data bit to a physical resource, an Inverse Fast Fourier Transform (IFFT) unit for modulating the data bit to data using an OFDM scheme, a Digital-to Analog Converter (DAC) for modulating a digital signal into an analog signal, a waveform shaping filter for converting the modulated signal into a desired waveform, an up-converter for raising frequency of a signal, and an antenna.

The receiver may include an antenna for receiving a signal, a down converter for lowering a frequency of the received signal, an Automatic Gain Controller (AGC) for automatically controlling an amplification factor so that output of a circuit becomes a predetermined range, an Analog-to-Digital Converter (ADC) for modulating an analog signal into a digital signal, a Fast Fourier Transform (FFT) unit for converting an input signal into data of a frequency domain, a demapper and a decoder for decoding an output signal.

Referring to FIG. 11, antenna Interference Cancellation (IC) is performed in the antennas of the transmitter and the receiver and analog IC is performed in the waveform shaping filter and the up-converter of the transmitter and the AGC and the down-converter of the receiver. ADC IC is performed in the DAC of the transmitter and the ADC of the receiver and baseband IC (or digital IC) is performed in the other parts of the transmitter and the receiver.

Hereinafter, IC schemes performed by each part of the transmitter and the receiver will be described.

3.1.1 Antenna IC

Figure 12:
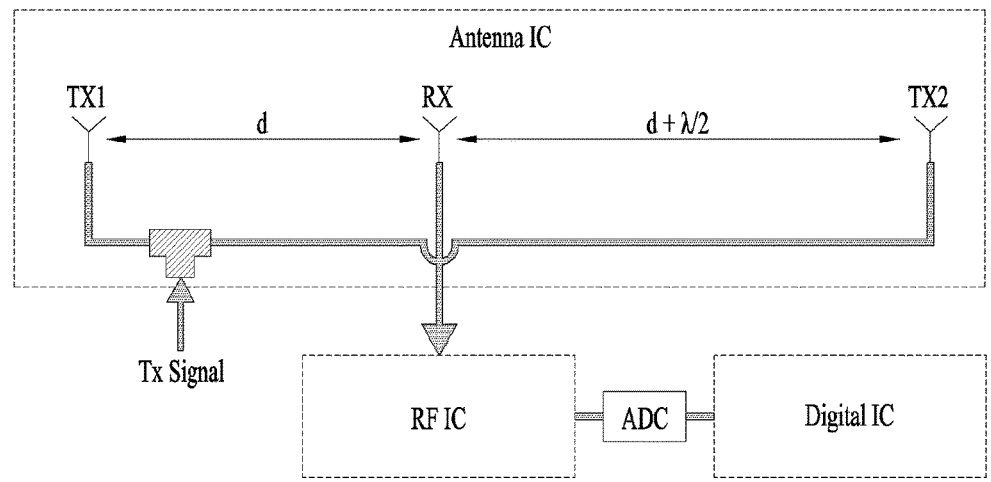
FIG. 12 is a diagram illustrating an exemplary antenna IC scheme using a distance between antennas.

Antenna IC is the simplest IC implementation scheme from among all IC schemes. FIG. 12 is a diagram illustrating an exemplary antenna IC scheme using a distance between antennas and FIG. 13 is a diagram illustrating an exemplary antenna IC scheme using a phase converter.

Referring to FIG. 12, one UE may perform IC using three antennas. In this case, two antennas are used as transmission antennas Tx and one antenna is used as a reception antenna Rx. The two transmission antennas are installed at intervals of a predetermined distance corresponding to about a half wavelength (wavelength/2) based on the reception antenna. This allows a signal transmitted from each transmission antenna to be received as a phase-inverted signal from the viewpoint of the reception antenna. Accordingly, an interference signal from among signals received by the reception antenna converges towards 0.

Figure 13:
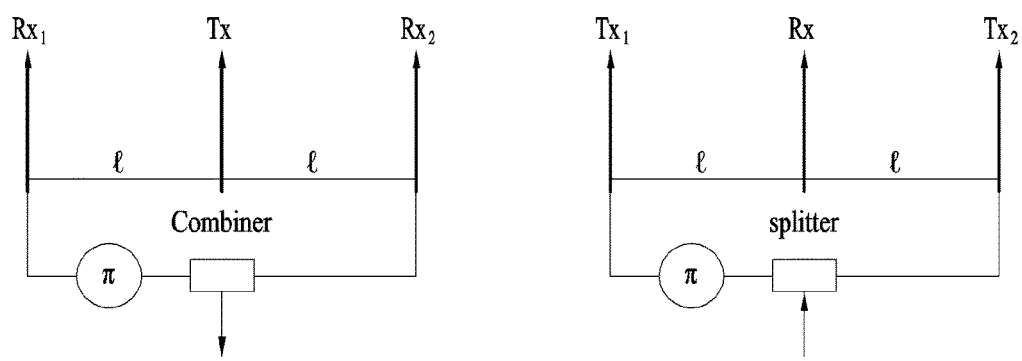
FIG. 13 is a diagram illustrating an exemplary antenna IC scheme using a phase converter.

Referring to FIG. 13, an interference signal may be cancelled using a phase shifter for inverting a phase of the second transmission antenna Tx2 in the same antenna configuration as in FIG. 12. The left drawing of FIG. 13 illustrates antenna deployment for cancelling self-interference using two reception antennas and the right drawing of FIG. 13 illustrates antenna deployment for cancelling interference using two transmission antennas.

Figure 14:
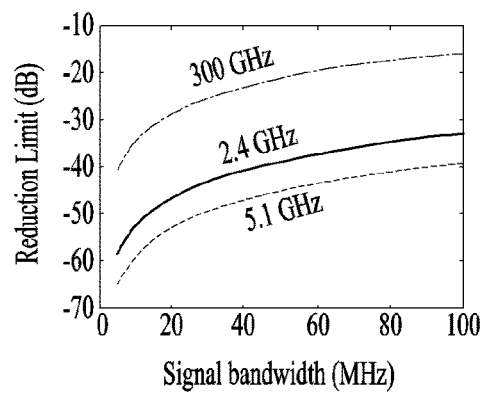
FIG. 14 illustrates IC performance according to bandwidth and center frequency of a signal when an antenna IC scheme is used.

The above antenna IC scheme is affected by bandwidth and center frequency of a transmission signal. That is, as the bandwidth of the transmission signal decreases and as the center frequency of the transmission signal increases, IC performance increases. FIG. 14 illustrates IC performance according to bandwidth and center frequency of a signal when an antenna IC scheme is used.

3.1.2 ADC IC

Even though an interference signal is known to a transmitter, the biggest reason why interference cannot be cancelled is an ADC. Therefore, interference can be cancelled by maximizing ADC performance. However, ADC IC has a difficulty in actual implementation due to limitation of quantization bits of the ADC. Since ADC performance has been gradually improved in recent times, required self-interference cancellation performance may be reduced.

3.1.3 Analog IC

Analog IC is a scheme of cancelling interference prior to ADC IC and cancels self-interference using an analog signal. Analog IC may be performed in an RF region or an Intermediate Frequency (IF) region. The analog IC scheme is performed in a manner of subtracting an interference signal from a signal received by a reception antenna by delaying phase and time of a transmitted analog signal.

The above analog IC scheme has an advantage of requiring only one transmission antenna and only one reception antenna as opposed to the number of antennas in the antenna IC scheme. However, since processing using an analog signal is performed, additional distortion may occur due to implementation complexity and circuit characteristics and thus IC performance may be remarkably changed.

3.1.4 Digital IC (Baseband IC)

Digital IC is a scheme for cancelling interference after ADC IC and includes all IC schemes performed in a baseband region. Digital IC may be performed in a manner of subtracting a transmitted digital signal from a received digital signal.

Alternatively, a UE or an eNB that transmits a signal using multiple antennas may perform beamforming or precoding so that a transmission signal may not be received by a reception antenna. If such schemes are performed on a baseband, the schemes may be categorized as digital IC.

However, digital IC can be performed when a digitally modulated signal is quantized in such a manner of being capable of restoring information about a desired signal. In order to perform digital IC, a magnitude difference in power between an interference signal and the desired signal should be within an ADC range after interference is cancelled using one or more of the IC schemes described in sections 3.1.1 to 3.1.3.

Figure 15:
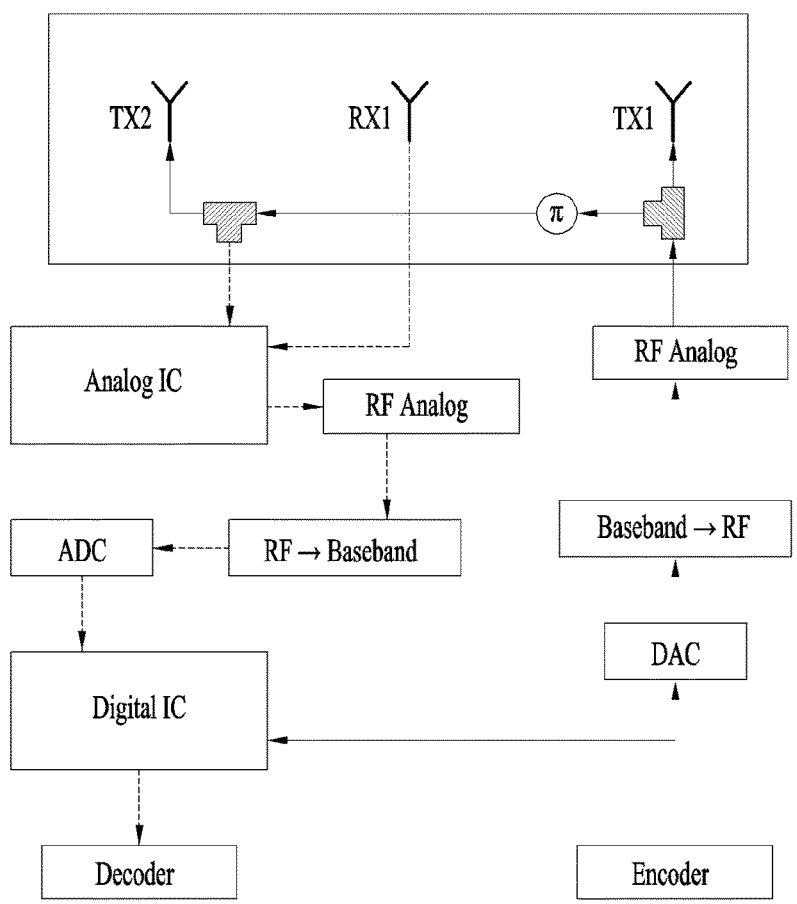
FIG. 15 illustrates a system to which various IC schemes are simultaneously applied.

FIG. 15 illustrates a system to which the IC schemes described in sections 3.1.1 to 3.1.4 are simultaneously applied. Overall IC performance may be improved as IC schemes of respective regions are added.

3.2 IC in MIMO System

An FDR system has been considered in a Single Input Single Output (SISO) scheme because complexity of Self-Interference Cancelation (SIC) remarkably increases in proportion to the number of reception antennas and transmission antennas. For example, in order to introduce FDR in a MIMO system (Nt×Nr) using N transmission antennas Nt and N reception antennas Nr, signals generated from the transmission antennas should be independently cancelled by the respective reception antennas so that a total of (Nt×Nr) SIC blocks is needed.

In this case, an SIC block may be an analog interference canceller for cancelling an analog signal or an RF signal or may be a digital interference canceller for cancelling a digital baseband signal. Alternatively, the SIC block may be an analog-to-digital interference canceller, which is a combination of the analog interference canceller and the digital interference canceller.

Accordingly, the number of SIC blocks in the MIMO system geometrically increases as the number of antennas increases.

For example, a conventional SISO system may cancel self-interference using one SIC block, whereas a 3×3 MIMO system requires a total of 9 SIC blocks to apply FDR.

In this way, many SIC blocks are needed to apply FDR to the MIMO system, which may increase hardware complexity of a UE. In addition, since SIC blocks should perform an adaptation procedure with respect to the UE, an adaptation time may increase or a training duration or signal necessary for performing the adaptation procedure may increase. Furthermore, UE performance may be degraded due to an inaccurate adaptation procedure.

4. FDR Zone Allocation Method

An FDR structure (i.e., a frame structure) proposed in the present invention assumes operation in a high frequency region so as to apply FDR using an antenna IC scheme. However, such an FDR structure may be applied to a normal cellular band by a combination with other IC methods (e.g., analog/digital IC, etc.).

4.1 FDR Zone Structure

Figure 16:
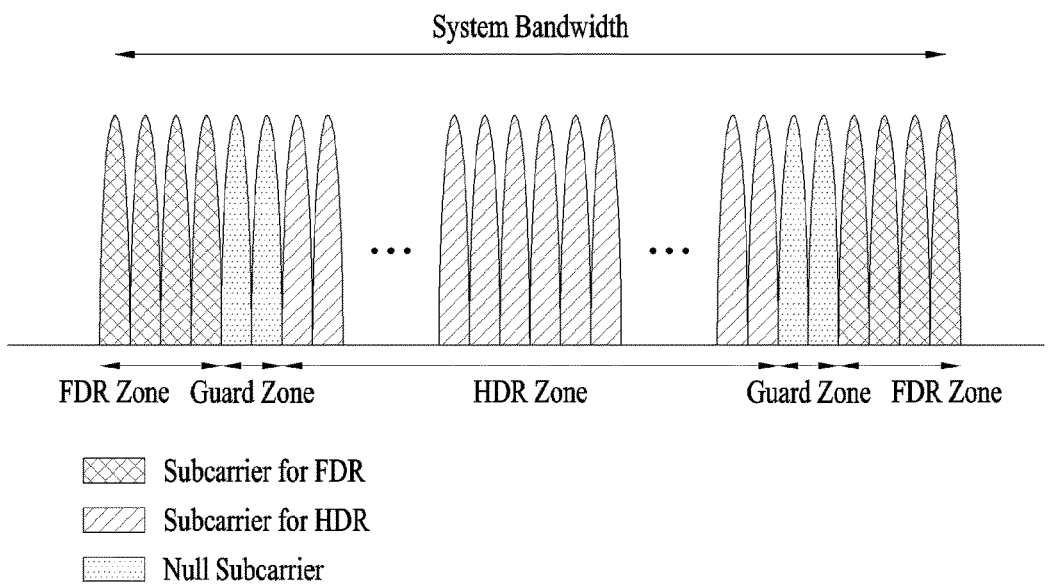
FIG. 16 is a diagram illustrating the concept of an FDR zone structure.

FIG. 16 is a diagram illustrating the concept of an FDR zone structure.

The FDR zone structure for supporting FDR may be represented as in FIG. 16. Referring to FIG. 16, entire system bandwidth used in the present invention may include an FDR zone, an HDR zone, and a guard zone. The FDR zone represents a zone in which a UE and/or an eNB operate as FDR and the HDR zone represents a zone in which the UE and/or the eNB operate as HDR as in an LTE/LTE-A system.

To support FDR, the FDR zone may include a group of 1 to N subcarriers and may be allocated to a predetermined location of the system bandwidth. In FIG. 16, the FDR zone is symmetrically arranged over the entire system bandwidth. That is, the same number of subcarriers is allocated as the FDR zone to the lowest frequency region and the highest frequency region. Further, the FDR zone may be allocated only to a predetermined part of the system bandwidth or may be separately allocated to a plurality of segmented regions.

To support HDR, the HDR zone may include a group of 1 to H subcarriers. In embodiments of the present invention, the entire system bandwidth is basically configured by an HDR scheme. This may refer to FIGS. 1 to 5. Therefore, the HDR zone may be allocated to the other bandwidth except for the FDR zone and the guard zone.

The guard zone is used to reduce an influence of interference between the FDR zone and the HDR zone and may be implemented using a predetermined number of subcarriers as null subcarriers. In this case, the null subcarriers refer to subcarriers on which no information is carried during transmission.

It is desirable that the location or start point of the guard zone be immediately adjacent to the FDR zone for the purpose of the guard zone. Then, it may be unnecessary to explicitly transmit information about the location or start point of the guard zone to a UE.

Although it is assumed that the structure illustrated in FIG. 16 is applied to an OFDMA system, the structure may be applied to other multiplexing systems (e.g., an SC-FDMA system). In addition, although the structure in which the FDR zone, the HDR zone, and the guard zone are allocated over the entire system bandwidth is schematically illustrated in FIG. 16, the schemes described in FIGS. 1 to 5 may be applied to a detailed structure of the FDR zone and the HDR zone.

4.2 FDR Zone Allocation Method

Figure 17:
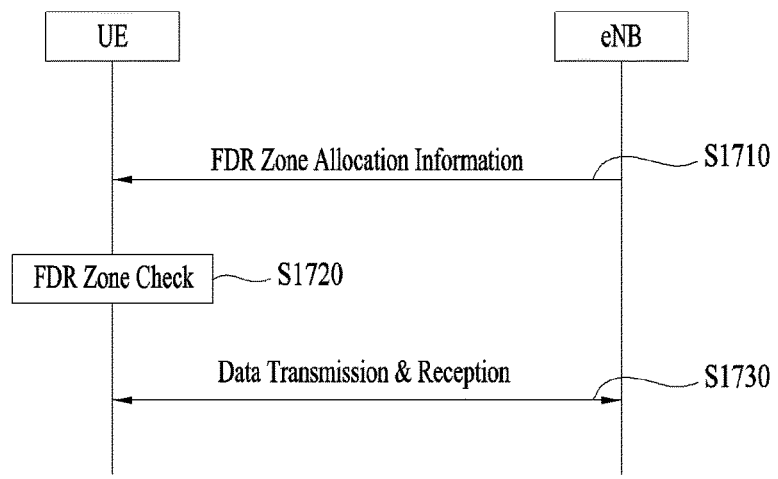
FIG. 17 is a diagram illustrating one of FDR zone allocation methods.

FIG. 17 is a diagram illustrating one of FDR zone allocation methods.

Referring to FIG. 17, an eNB allocates a predetermined part of system bandwidth to an FDR zone. For a method for configuring the FDR zone, refer to FIG. 16. Next, the eNB transmits FDR zone allocation information to a UE in order to inform the UE of configuration of the allocated FDR zone and/or the system bandwidth (S1710).

The UE may check the FDR zone configured in the system bandwidth based on the received FDR zone allocation information (S1720).

Next, the UE may transmit and receive data, signals, and/or control information to and from the eNB in the allocated FDR zone using an FDR scheme (S1730).

The FDR zone allocation information in S1710 may be configured as follows.

(1) Method 1: the FDR zone allocation information is configured to include only the number N of FDR subcarriers.

(2) Method 2: the FDR zone allocation information is configured to include the number N of FDR subcarriers and location information M about FDR zone allocation is allocated.

(3) Method 3: the FDR zone allocation information is configured to include the number N of FDR subcarriers, location information M about FDR zone allocation, and the number L of guard subcarriers.

(4) Method 4: the FDR zone allocation information is configured to include the number N of FDR subcarriers, location information M about FDR zone allocation, the number H of HDR subcarriers, and the number L of guard subcarriers.

In Method 1, since the UE becomes aware of only the number of FDR subcarriers, the FDR zone needs to be allocated to a fixed location in system bandwidth. For example, the FDR zone may be configured by N subcarriers starting from the lowest subcarrier (or a predetermined point in a system) of the system bandwidth. If the FDR zone is symmetrically configured as illustrated in FIG. 16, the FDR zone may be configured by N subcarriers starting from the highest subcarrier. In this case, the other regions of the system bandwidth except for the FDR zone are configured as an HDR zone.

In Method 2, the FDR zone may be configured by N subcarriers starting from a subcarrier indicated by the location information M about FDR zone allocation. Method 2 is advantageous in that the FDR zone is capable of being dynamically configured. Obviously, the other regions of the system bandwidth except for the FDR zone are configured as the HDR zone.

In Method 3, the system bandwidth can be more efficiently configured by adjusting the number of guard subcarriers according to the size of the FDR zone. In the case in which the number of guard subcarriers is not explicitly indicated (e.g., Methods 1 and 2), as many subcarriers as a predetermined number should be used as the guard subcarriers and the guard subcarriers should be adjacently arranged next to the FDR zone. In this case, since the number of guard subcarriers should be determined in consideration of the largest allocable size of the FDR zone, the number of guard subcarriers may increase.

In Method 4, the HDR zone is explicitly allocated by explicitly indicating the number H of HDR subcarriers in Method 3.

Hereinafter, methods for indicating the FDR zone allocation information to the UE will be described.

4.2.1 Dynamic Indication Method

In order to flexibly configure and apply the FDR zone with respect to each Transmit Time Interval (TTI) in a dynamic manner, the FDR zone allocation information may be transmitted over a control channel transmitted in each TTI. For example, in a 3GPP LTE/LTE-A system, a PDCCH, an Enhanced-PDCCH (E-PDCCH), or a system information block may be used and the FDR zone allocation information may be included in a DCI format.

Referring to FIG. 17, the eNB may transmit the FDR zone allocation information to the UE through a PDCCH signal, an E-PDCCH signal, System Information Block type x (SIBx), or a higher-layer signal in step S1710.

In embodiments of the present invention, the TTI may be a unit of a subframe, a frame, or a superframe. Alternatively, the TTI may be configured as a unit of a few subframes.

The FDR zone allocation information may include one or more of the above-described information N, M, L, and H.

4.2.2 Semi-Static Indication Method

In embodiments of the present invention, the same FDR allocation information may be used during a predetermined number or more of TTIs. That is, during a predetermined number or more of TTIs, the FDR zone may be configured using the same number of subcarriers.

To this end, the eNB may transmit the FDR zone allocation information to the UE through FDR higher-layer signaling (e.g., RRC signaling). In this case, although the same FDR zone allocation information may be defined using cell-specific signaling in one cell, different FDR zone allocation information for each UE may be defined through UE-specific signaling.

If a different FDR zone is configured for each UE through UE-specific signaling, the FDR zone allocated to each UE is desirably set to be smaller or equal to an FDR zone supported by the eNB. That is, if K UEs are present in a specific cell, the number of subcarriers for the FDR zone may be defined as $N_{UE_1, \ldots, K} \leq N_{eNB}$ (in this case, $N_{UE_1, \ldots, K}$ is the number of subcarriers for an FDR zone allocated to the UE and $N_{eNB}$ is the number of subcarriers for an FDR zone supported by the eNB).

Alternatively, the FDR zone allocation information may define the same FDR allocation location or start point in one cell through cell-specific signaling. For example, in embodiments of the present invention, since CA is supported, one eNB may manage a plurality of cells. In this case, the FDR zone may be individually configured in each cell. However, when the FDR zone allocation information is transmitted through UE-specific signaling, the FDR zone allocation information may define a different FDR allocation location or a different FDR allocation start point for each UE in a specific cell.

Referring to FIG. 17, if the FDR zone is semi-statically allocated, the eNB may transmit the FDR zone allocation information to the UE through a PDCCH signal, an E-PDCCH signal, SIBx, or a higher-layer signal in a TTI in which the first FDR zone is allocated and/or a TTI in which the FDR zone is changed (refer to step S1710).

4.2.3 Static Allocation Method

The FDR zone allocation information may be identically defined in all TTIs. That is, the eNB may configure the FDR zone using the same number of subcarriers during all TTIs. To this end, the FDR zone allocation information may be defined as a system parameter.

5. Apparatuses

Figure 18:
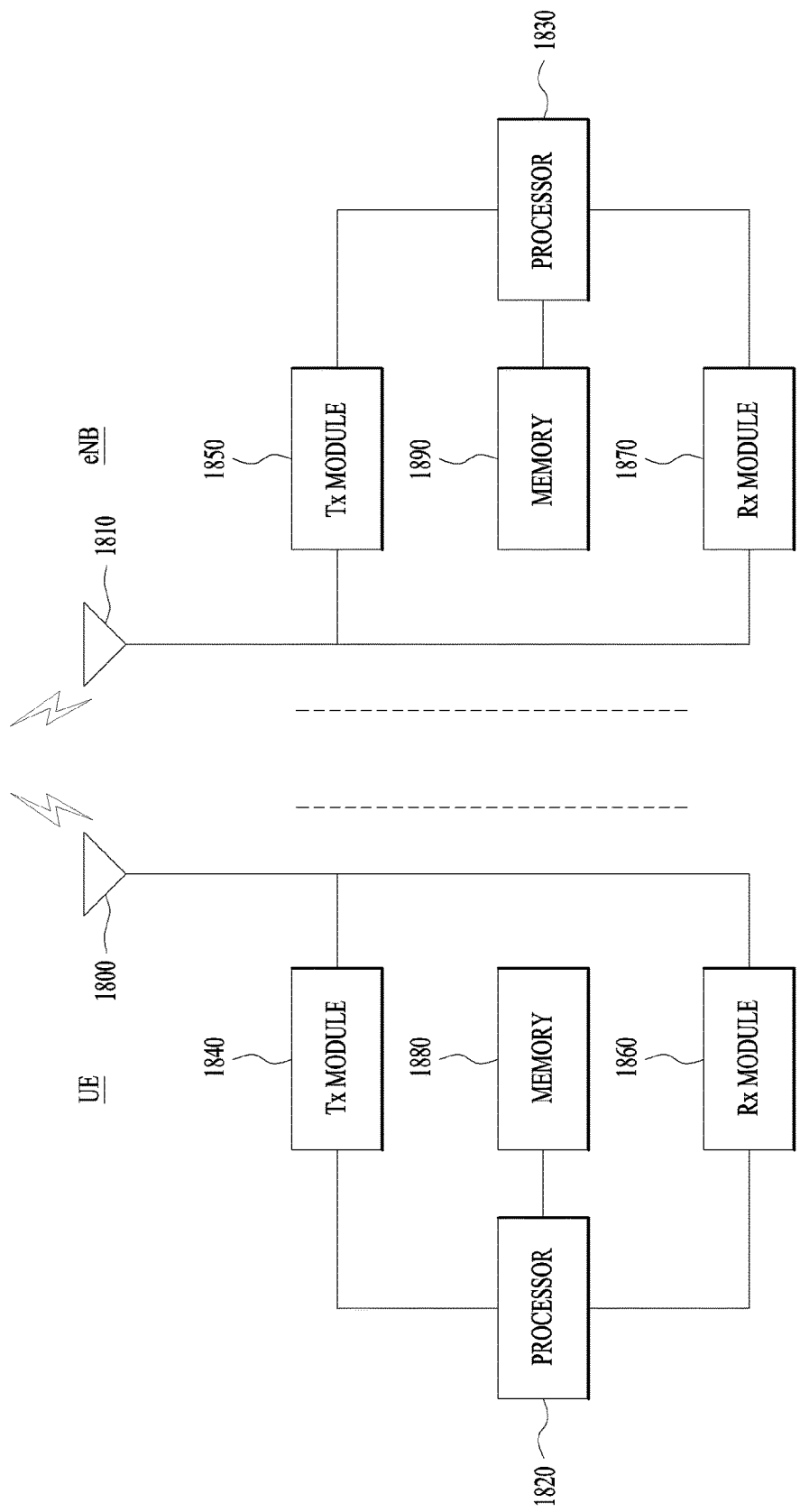
FIG. 18 is a diagram illustrating a means for implementing the methods described in FIGS. 1 to 17.

Apparatuses illustrated in FIG. 18 are means that can implement the methods described before with reference to FIGS. 1 to 17.

A UE may act as a transmitter on a UL and as a receiver on a DL. An eNB may act as a receiver on a UL and as a transmitter on a DL.

That is, each of the UE and the eNB may include a Transmission (Tx) module 1840 or 1850 and a Reception (Rx) module 1860 or 1870, for controlling transmission and reception of information, data, and/or messages, and an antenna 1800 or 1810 for transmitting and receiving information, data, and/or messages.

Although the Tx module and the Rx module are illustrated in FIG. 18 as sharing the antenna, separate antennas may be installed in the Tx module and the Rx module as illustrated in FIG. 8. In addition, although one antenna is illustrated in each of the UE and the eNB, two or more antennas may be installed in each of the UE and the eNB.

Each of the UE and the eNB may further include a processor 1820 or 1830 for implementing the afore-described embodiments of the present invention and a memory 1880 or 1890 for temporarily or permanently storing operations of the processor 1820 or 1830.

The embodiments of the present invention may be performed using the components and functions of the above-described UE and eNB. For example, the processor of the eNB may allocate an FDR zone, a guard zone, and an HDR zone by combining the methods described in sections 1 to 4. Moreover, the eNB may transmit FDR zone allocation information to the UE using the schemes described in FIG. 17 and sections 4.2.1 to 4.2.3. The UE may perform FDR based communication with the eNB in an FDR zone based on the received FDR zone allocation information. For a detailed description, refer to section 4.

The Tx module and the Rx module of the UE and the eNB may perform a packet modulation/demodulation function for data transmission, a high-speed packet channel coding function, OFDMA packet scheduling, TDD packet scheduling, and/or channelization. Each of the UE and the eNB of FIG. 18 may further include a low-power Radio Frequency (RF)/Intermediate Frequency (IF) module. In this case, the Tx module and the Rx module may be called a transmitter and a receiver, respectively. If the Tx module and the Rx module are used together, they may be called a transceiver.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. A software code may be stored in the memory 1880 or 1890 and executed by the processor 1840 or 1830. The memory is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

Embodiments of the present invention are applicable to various wireless access systems including a 3GPP system, a 3GPP2 system, and/or an IEEE 802.xx system. In addition to these wireless access systems, the embodiments of the present invention are applicable to all technical fields in which the wireless access systems find their applications.

What is claimed is:

1. A method for allocating a Full Duplex Radio (FDR) zone by a Base Station (BS) in a wireless access system supporting an FDR scheme, the method comprising:
   transmitting a control signal including FDR zone allocation information to a User Equipment (UE); and
   performing FDR based communication, based on the FDR zone allocation information, with the UE through an FDR zone indicated by the FDR zone allocation information,
   wherein the FDR zone allocation information includes first information indicating a number of subcarriers constituting the FDR zone, location information indicating a start point of the FDR zone, and second information indicating a number of subcarriers constituting a guard zone located between the FDR zone and a Half Duplex Radio (HDR) zone.

2. The method according to claim 1,
   wherein the control signal is a Physical Downlink Control Channel (PDCCH) signal transmitted through a control channel region or an Enhanced-Physical Downlink Control Channel (E-PDCCH) transmitted through a data channel region.

3. The method according to claim 1,
   wherein the FDR zone allocation information is semi-statically configured during a predetermined number of Transmission Time Intervals (TTIs), and
   the FDR zone allocation information is transmitted through a higher-layer signal.

4. The method according to claim 3,
   wherein, if the FDR zone allocation information is differently defined according to each UE managed by the BS, the FDR zone allocation information is transmitted through UE-specific signaling.

5. The method according to claim 3,
   wherein, if the FDR zone allocation information is defined according to each cell, the FDR zone allocation information is transmitted through cell-specific signaling.

6. A method for receiving Full Duplex Radio (FDR) zone allocation information in a wireless access system supporting an FDR scheme, the method comprising:
   receiving a control signal including the FDR zone allocation information from a Base Station (BS); and
   performing FDR based communication, based on the FDR zone allocation information, with the BS through an FDR zone indicated by the FDR zone allocation information,
   wherein the FDR zone allocation information includes first information indicating a number of subcarriers constituting the FDR zone, location information indicating a start point of the FDR zone, and second information indicating a number of subcarriers constituting a guard zone located between the FDR zone and a Half Duplex Radio (HDR) zone.

7. The method according to claim 6,
   wherein the control signal is a Physical Downlink Control Channel (PDCCH) signal transmitted through a control channel region or an Enhanced-Physical Downlink Control Channel (E-PDCCH) transmitted through a data channel region.

8. The method according to claim 6,
wherein the FDR zone allocation information is semi-statically configured during a predetermined number of Transmission Time Intervals (TTIs), and
the FDR zone allocation information is transmitted through a higher-layer signal.

9. The method according to claim 8,
wherein, if the FDR zone allocation information is differently defined according to each User Equipment (UE) managed by the BS, the FDR zone allocation information is transmitted through UE-specific signaling.

10. The method according to claim 8,
wherein, if the FDR zone allocation information is defined according to each cell, the FDR zone allocation information is transmitted through cell-specific signaling.

11. A User Equipment (UE) for receiving Full Duplex Radio (FDR) zone allocation information in a wireless access system supporting an FDR scheme, the UE comprising:
a receiver;
a transmitter; and
a processor configured to support the FDR scheme in association with the receiver and the transmitter,
wherein the processor is configured to:
control the receiver to receive a control signal including the FDR zone allocation information from a Base Station (BS); and
control the receiver and the transmitter to perform FDR based communication, based on the FDR zone allocation information, with the BS through an FDR zone indicated by the FDR zone allocation information,
wherein the FDR zone allocation information includes first information indicating a number of subcarriers constituting the FDR zone, location information indicating a start point of the FDR zone, and second information indicating a number of subcarriers constituting a guard zone located between the FDR zone and a Half Duplex Radio (HDR) zone.

12. The UE according to claim 11,
wherein the control signal is a Physical Downlink Control Channel (PDCCH) signal transmitted through a control channel region or an Enhanced-Physical Downlink Control Channel (E-PDCCH) transmitted through a data channel region.

13. The UE according to claim 11,
wherein the FDR zone allocation information is semi-statically configured during a predetermined number of Transmission Time Intervals (TTIs), and
the FDR zone allocation information is transmitted through a higher-layer signal.

14. The UE according to claim 13,
wherein, if the FDR zone allocation information is differently defined according to each User Equipment (UE) managed by the BS, the FDR zone allocation information is transmitted through UE-specific signaling.

15. The UE according to claim 13,
wherein, if the FDR zone allocation information is defined according to each cell, the FDR zone allocation information is transmitted through cell-specific signaling.

* * * * *